US009203631B2

(12) United States Patent
Han et al.

(10) Patent No.: US 9,203,631 B2
(45) Date of Patent: *Dec. 1, 2015

(54) MULTICAST DISTRIBUTION TREES FOR MRSVP-TE BASED MULTICAST VIRTUAL PRIVATE NETWORKS

(71) Applicant: Futurewei Technologies, Inc., Plano, TX (US)

(72) Inventors: Lin Han, San Jose, CA (US); Renwei Li, Fremont, CA (US); Katherine Zhao, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/931,434

(22) Filed: Jun. 28, 2013

(65) Prior Publication Data
US 2014/0003281 A1  Jan. 2, 2014

Related U.S. Application Data

(60) Provisional application No. 61/666,613, filed on Jun. 29, 2012.

(51) Int. Cl.
*H04L 12/28*  (2006.01)
*H04L 12/26*  (2006.01)
*H04B 3/30*  (2006.01)
*H04L 12/18*  (2006.01)

(52) U.S. Cl.
CPC ............. *H04L 12/18* (2013.01); *H04L 12/185* (2013.01); *H04L 12/1877* (2013.01)

(58) Field of Classification Search
None
See application file for complete search history.

(56) References Cited

U.S. PATENT DOCUMENTS

| 7,830,787 B1 * | 11/2010 | Wijnands et al. ............. 370/218 |
| 2008/0130515 A1 * | 6/2008 | Vasseur ........................ 370/254 |
| 2008/0298360 A1 * | 12/2008 | Wijnands et al. ............. 370/389 |
| 2011/0188499 A1 * | 8/2011 | Wijnands et al. ............. 370/390 |

OTHER PUBLICATIONS

Li, R., et al., "Receiver-Driven Multicast Traffic Engineered Label Switched Paths," draft-lzj-mpls-receiver-driven-multicast-rsvp-te-00.txt, Network Working Group, Standards Track, Mar. 4, 2012, pp. 1-25.
Bradner, S., "Key Words for use in RFCs to Indicate Requirement Levels," Network Working Group, Best Current Practice, Mar. 1997, RFC 2119, pp. 1-3.
Braden, R., et al., "Resource ReSerVation Protocol (RSVP)," Version 1 Functional Specification, Network Working Group, Standards Track, Sep. 1997, RFC 2205, pp. 1-113.

(Continued)

*Primary Examiner* — Kiet Tang
(74) *Attorney, Agent, or Firm* — Conley Rose, P.C.; Grant Rodolph; William H. Dietrich

(57) ABSTRACT

In a source provider edge (PE) router, a method of forming a data multicast distribution tree (MDT) comprising the steps of monitoring a rate of multicast data traffic within a default MDT, determining that the rate exceeds a threshold, sending a join message to at least one receiver PE router in response to the determining, wherein the join message comprises a MDT number that identifies the data MDT, receiving a path message from the at least one receiver PE router and thereby forming the data MDT, and sending multicast data traffic via the data MDT.

20 Claims, 8 Drawing Sheets

(56) References Cited

OTHER PUBLICATIONS

Awduche, D., et al., "RSVP-TE: Extensions to RSVP for LSP Tunnels," Network Working Group, Standards Track, Dec. 2001, RFC 3209, pp. 1-62.

Fenner, B., et al., "Protocol Independent Multicast-Sparse Mode (PIM-SM): Protocol Specification (Revised)," Network Working Group, Standards Track, Aug. 2006, RFC 4601, pp. 1-112.

Aggarwal, R., et al., "Extensions to Resource Reservation Protocol—Traffic Engineering (RSVP-TE) for Point-to-Multipoint TE Label Switched Paths (LSPs)," Network Working Group, Standards Track, May 2007, RFC 4875, pp. 1-53.

Bhaskar, N., et al., "Bootstrap Router (BSR) Mechanism for Protocol Independent Multicast (PIM)," Network Working Group, Standards Track, Jan. 2008, RFC 5059, pp. 1-41.

Rosen, E., et al., "Cisco Systems' Solution for Multicast in BGP/MPLS IP VPNs," Independent Submission, Historic, Oct. 2010, RFC 6037, pp. 1-25.

Wijnands, IJ., et al., "Label Distribution Protocol Extensions for Point-to-Multipoint and Multipoint-to-Multipoint Label Switched Paths," Internet Engineering Task Force (IETF), Standards Track, Nov. 2011, RFC 6388, pp. 1-39.

Rosen, E., et al., "Multicast in MPLS/BGP IP VPNs," Internet Engineering Task Force (IETF), Standards Track, Feb. 2012, RFC 6513, pp. 1-88.

Aggarwal, R., et al., "BGP Encodings and Procedures for Multicast in MPLS/BGP IP VPNs," Internet Engineering Task Force (IETF), Standards Track, Feb. 2012, RFC 6514, pp. 1-59.

* cited by examiner

MULTICAST DISTRIBUTION TREES FOR MRSVP-TE BASED MULTICAST VIRTUAL PRIVATE NETWORKS

CROSS-REFERENCE TO RELATED APPLICATIONS

The present application claims benefit of U.S. Provisional Patent Application No. 61/666,613 filed Jun. 29, 2012 by Lin Han, et al. and entitled "Methods to Setup a Multicast Distribution Tree for mRSVP-TE Based mVPN Solutions," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A multicast virtual private network (mVPN) allows a service provider to configure and support multicast traffic in a multiprotocol label switching (MPLS) virtual private network (VPN) environment. For example, an mVPN may support the routing and forwarding of multicast data packets for VPN routing and forwarding (VRF) instances and provides a mechanism to transport VPN multicast data packets across the service provider backbone. mVPNs may be useful for video conferencing or customer specific broadcasting as examples.

An mVPN provides transparent interconnection within its private network across the network backbone of a service provider. Multicast services are a bandwidth conserving solution to reduce data traffic by delivering a single data stream to a plurality of receivers. For example, multicast data services may deliver source traffic to multiple receivers without adding additional burdens on the source or the receivers while using minimal network bandwidth.

There are various existing solutions for supporting mVPN on a service provider's network. The solutions may be used to carry protocol independent multicast (PIM) signaling from customers over a service provider's network. However, the solutions may be complex to implement and lack scalability across a service provider's network. For example, at least one solution involves using border gateway protocol (BGP). The solution may require BGP to be extended with seven types of Network Layer Reachability Information (NLRI) and four new BGP attributes. As such, it may be desirable to provide simpler and more scalable means for providing quality-of-service (QoS) assurance and traffic-engineering (TE) path support for mVPN applications.

SUMMARY

In one example embodiment, a data multicast distribution tree (MDT) is formed. The formation of the data MDT comprises a source provider edge (PE) router monitoring a rate of multicast data traffic within a default MDT and determining that the rate exceeds a threshold. The source PE router sends a join message to at least one receiver PE router in response to determining that the rate exceeds the threshold, wherein the join message comprises a MDT number that identifies the data MDT. The at least one receiver PE router receives the join message and sends a path message. The source router receives the path message(s) from the at least one receiver PE router thereby forming the data MDT. The source PE router then sends multicast data traffic via the data MDT.

In another example embodiment, a router is configured to monitor a rate of multicast data traffic within a default MDT and determine that the rate exceeds a threshold. The router may be further configured to send a join message in response to determining that the rate exceeds the threshold, wherein the join message comprises a MDT number that identifies the data MDT. The router may be further configured to receive a path message thereby forming the data MDT and send multicast data traffic via the data MDT.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
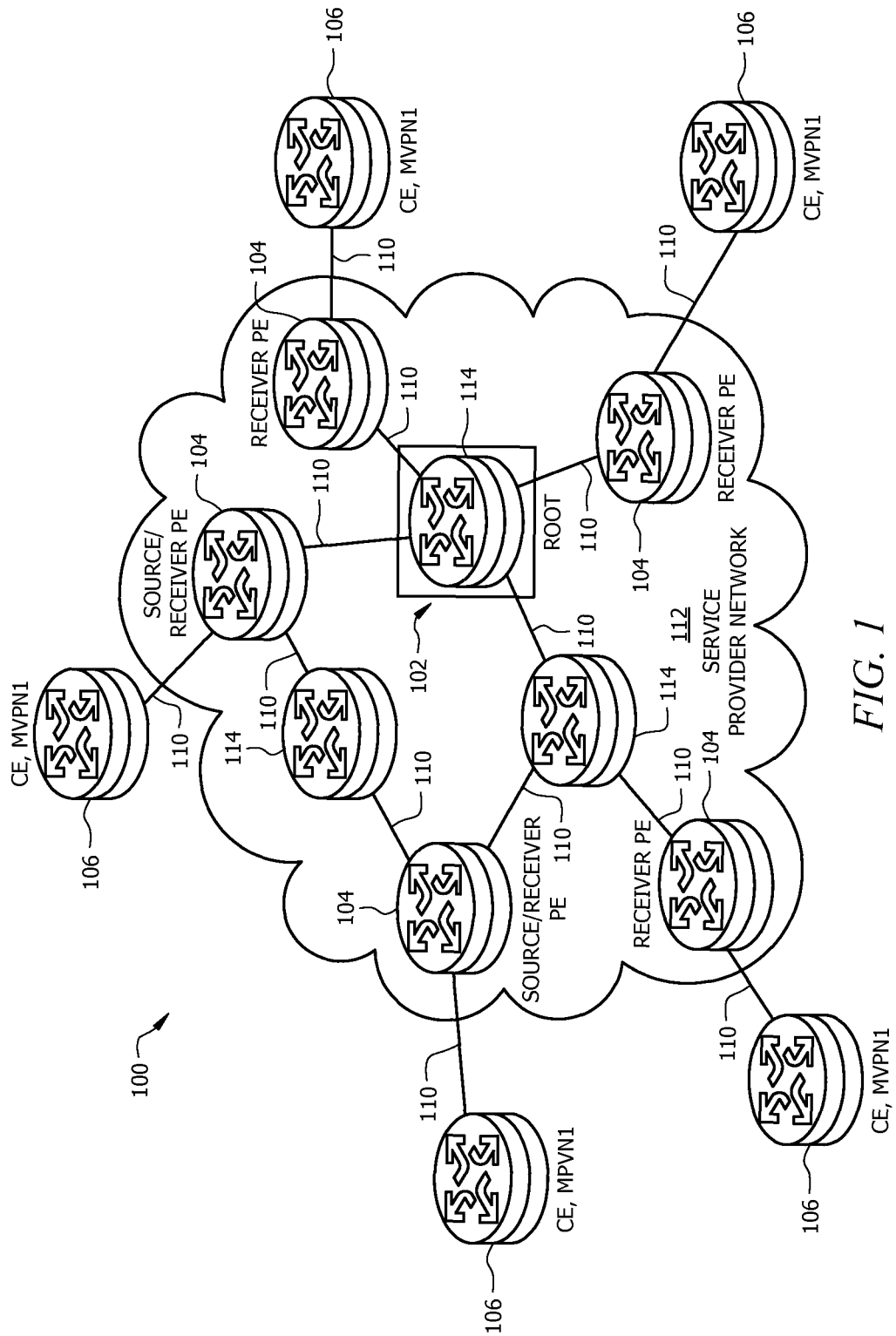
FIG. 1 is a schematic view of an example embodiment of a multicast virtual private network.

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A multicast virtual private network (mVPN) may operate as portion of a networking infrastructure. For example, an mVPN may form a portion of a network layer within an Open Systems Interconnection (OSI) model of a network architecture. The network layer may be configured to provide path determination and logical addressing for data traffic (e.g., one or more data packets) communicated through a network. As such, the network layer may provide functional and/or procedural means of transferring data traffic from a source host on a network to one or more destination hosts on the same or different network. For example, the network layer may be responsible for routing functions, encapsulation, data packet fragmentation, data packer reassembly, delivery error reporting, any other suitable data packet processing or handling function as would be appreciated by one of ordinary skill in the art upon viewing this disclosure, or combinations thereof.

Multicast data traffic is communicated via a multicast tree (e.g., a multicast distribution tree (MDT)) which may comprise two or more networks, for example, a multiprotocol label switching (MPLS) network operated by a service provider and an internet protocol (IP) network on a customer's site. For example, multicast data traffic may start on a customer's site as an IP multicast and then may be communicated over the MPLS network to other customer's sites. Additionally, in such an example, the multicast data traffic may be distributed over a protocol independent multicast (PIM) MDT on the customer's site and over via multicast-label-switched-path (mLSP) tunnels in the service provider's MPLS network.

Disclosed herein are example embodiments of an mVPN having an MDT. In some example embodiments disclosed herein, the mVPN may be configured to employ multicast resource reservation protocol-traffic engineering (mRSVP-TE) to provide multicast services to deliver data traffic to a plurality of receivers. MRSVP-TE is an extension to resource reservation protocol-traffic engineering (RSVP-TE) for multicast applications within an MPLS network and may employ features from RSVP-TE, such as QoS assurance and TE paths. However, in contrast to RSVP-TE where a multicast data tree may be set up by a multicast source or head node of the multicast data tree, the multicast data tree in mRSVP-TE may be driven by one or more multicast receivers or leaf nodes. As disclosed herein, in an example embodiment where a protocol independent multicasting (PIM) is used on a customer's site and mRSVP-TE is used on a service provider's network without PIM being enabled, an mVPN may be employed to establish a data MDT and to offload data traffic from a default MDT to the data MDT to provide the ability to inter-work the customer's PIM with the service provider's mRSVP-TE.

Referring to FIG. 1 an example embodiment of an mVPN 100 is illustrated. In such an example embodiment, the mVPN 100 generally comprises a plurality of routers (e.g., label switch routers (LSRs)), for example a root router 102, one or more provider edge (PE) routers 104, one or more customer edge (CE) routers 106, and one or more core routers 114. Additionally, the plurality of routers (e.g., the root router 102, the PE routers 104, the CE routers 106, the core routers 114, etc.) may be interconnect and in data communication with each other via one or more links 110 (e.g., a wireless link or a wired link). Further, the mVPN 100 may be configured to employ an internet group management protocol (IGMP), an intermediate system to system (IS-IS) protocol, a routing information protocol (RIP), a border gateway protocol (BGP), a distance vector multicast routing protocol (DVMRP), a multicast open shortest path first (MOSPF), and/or any suitable routing protocol as would be appreciated by one of ordinary skill in the art upon viewing this disclosure.

The plurality of routers (e.g., the root router 102, the PE routers 104, the CE routers 106, the core routers 114, etc.) may each be a device configured to forward data packets within a network and/or between multiple networks. For example, a core router 114 may be a router within a service provider network 112 and may be configured to form a portion of a backbone or a core for the service provider network 112. A PE router 104 may be a router within the service provider network 112 which may be configured to form an interface between the service provider network 112 and one or more CE routers 106. Each PE router 104 comprises a reverse-path forwarding (RPF) interface, such as, an incoming interface (IIF) for PIM state (e.g., PIM state (source (S), group (G)) and an outgoing interface (OIF) for PIM state, for example, to manage data traffic forwarding within the mVPN 100. In an example embodiment, the IIF and/or the OIF may be configured as a selective provider multicast service interface (S-PMSI) for point-to-multipoint (P2MP) tunnels, as will be disclosed herein. Alternatively, the IIF and/or the OIF may be configured as a multidirectional inclusive provider multicast service interface (MI-PMSI) for multipoint-to-multipoint (MP2MP) tunneling, as will be disclosed herein. Additionally, each PE router 104 further comprises an outgoing interface list (OLIST) for PIM state. In an example embodiment, an MI-PMSI interface may be an interface between an IP multicast tree and an MDT. In such an example embodiment, when an MI-PMSI is an OIF in an OLIST for a multicast forwarding entry (S, G), the IP multicast stream (S, G) is replicated for the MI-PMSI and sent to the MI-PMSI interface. In another example embodiment, when the MI-PMSI is an IIF for a multicast forwarding entry (S, G), a data packet (e.g., an MPLS packet) received is forwarded by the forwarding entry (S, G) if the decapsulated data packet is an IP packet and if the source and group are S and G, respectively.

Additionally, each PE router 104 may be configured as a source-PE and/or a receiver-PE with respect to the mVPN 100. For example, a source-PE may be generally characterized as a PE router 104 where a multicast source (e.g., a source host) is located on or behind a CE router 106. Alternatively, a receiver-PE may be generally characterized as a PE router 104 where a multicast receiver (e.g., a receiver host) is located on or behind a CE router 106. A CE router 106 may be a router controlled or operated by a customer (e.g., a router located at a customer's premises) which is configured to connect to the service provider network 112, for example, via a PE router 104. Referring to the example embodiment of FIG. 1, the mVPN 100 comprises the root router 102 in data communication with the PE routers 104 and the core routers 114. Additionally, the PE routers 104 are each in data communication with a CE router 106. Additionally, each of the routers may be configured to employ a routing table, forwarding table, an mVPN table, or the-like, to control and/or direct data traffic for a given mVPN. For example, each of the routers may generate or establish a routing table to coordinate data communication with other routers within the mVPN 100. In an example embodiment, the routing table may be established via a flooding algorithm, a spanning trees algorithm, a reverse path broadcasting algorithm, a truncated reverse path broadcasting algorithm, a reverse path multicasting algorithm, a core-based tree algorithm, or any other suitable multicast forwarding algorithm as would be appreciated by one of ordinary skill in the art upon viewing this disclosure. Additionally, one or more PE routers 104 (e.g., a root router 102) may comprise settable data traffic flow threshold and may be configured to initiate a data MDT formation in response to exceeding the data traffic flow threshold, as will be disclosed herein.

Figure 2:
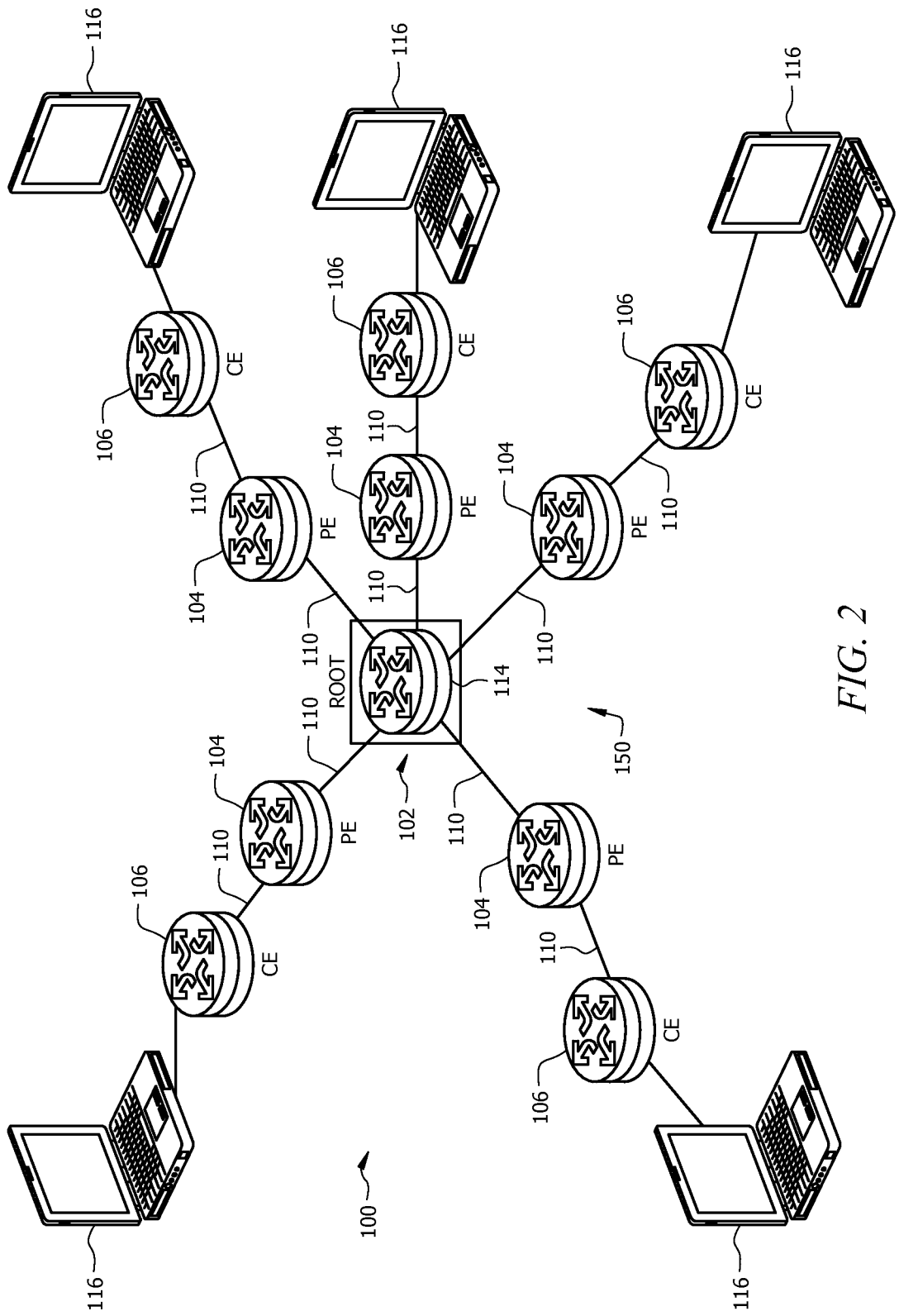
FIG. 2 is a schematic view of an example embodiment of a default multicast distribution tree.
Figure 3:
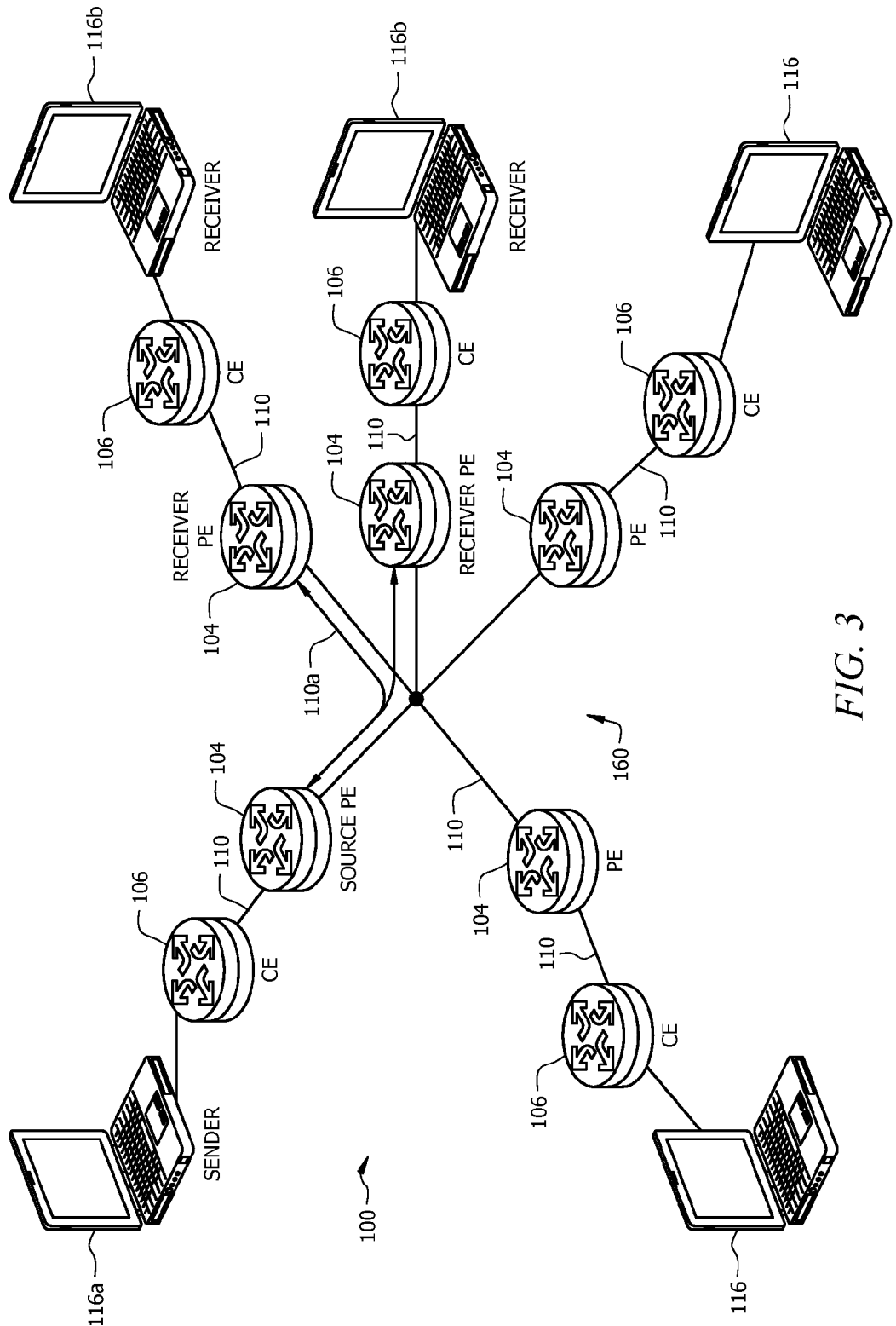
FIG. 3 is a schematic view of an example embodiment of a data multicast distribution tree.

Referring to FIGS. 2-3, a multicast-label-switched-path (mLSP) or an MDT is generally configured to provide multicast services for the mVPN 100. For example, one or more MDTs may be established and each may define one or more paths (e.g., virtual paths) within the mVPN 100 via the plurality of routers (e.g., the root router 102, the PE routers 104, the CE routers 106, the core routers 114, etc.) to control and/or direct the flow of data traffic through the mVPN 100, for example, to provide multicast services between a source host and a plurality of receiver hosts who are interested in a particular multicast data stream. The MDT may comprise one or more sub-label-switched-paths (sub-LSP) which connect a plurality of routers (e.g., LSRs, PE routers, core routers, etc.) to form a MPLS multicast network. An MDT may be configured as a default MDT to provide MP2MP data packet communication, as will be disclosed herein. In such an example, the root router 102 is the head of the default MDT 150 and each of the PE routers 104 are leaf PEs of the default MDT 150. Alternatively, an MDT may be configured as a data MDT 160 to provide P2MP data packet communication, as will be disclosed herein. In an example embodiment, an MDT may be head driven or leaf driven. For example, in a leaf driven MDT, any leaf PE (e.g., a source-PE router) may initiate a data MDT, as will be disclosed herein.

Referring to FIG. 2, a default MDT 150 is illustrated. In such an example embodiment, the default MDT 150 comprises the root router 102 in data communication with a plurality of PE routers 104. Additionally, each of the PE routers 104 is in data communication with a CE router 106 which is coupled to a terminal 116 (e.g., a computer). A default MDT 150 is generally a multidirectional shared tree with each connected PE configured as a leaf PE or node. In such an example embodiment, the default MDT 150 is a MP2MP data communication structure and is configured such that every PE router 104 within the mVPN 100 may be utilized as a source-PE and/or a receiver-PE, for example, every PE router 104 is capable of sending and/or receiving multicast data traffic. Further, the default MDT 150 is configured to provide bidirectional communication between the PE routers 104. A default MDT 150 may be configured to perform signaling, forming one or more MDTs (e.g., a data MDT, as will be disclosed), pruning an MDT (e.g., removing inactive PE routers 104), adding nodes (e.g., receiver-PE, PE routers 104, etc.) to an MDT, communicating data traffic, performing any other suitable multicasting operation as would be appreciated by one of ordinary skill in the art upon viewing this disclosure, or combination thereof. For example, the default MDT 150 may be configured to communicate a customer's PIM signaling data packets and/or multicast data packets. Additionally, the default MDT 150 may support PIM multicast messages, such as, HELLO messages, JOIN/PRUNE messages, ASSERT messages, BOOTSTRAP messages, etc.

Referring to FIG. 3, a data MDT 160 is illustrated. In such an example embodiment, the data MDT 160 comprises a source host 116a in signal communication (e.g., via a data link 110a) with a plurality of receiver hosts 116b via a plurality of PE routers 104. The data MDT 160 is a P2MP data communication structure and is configured such that a source-PE (e.g., a PE router 104 coupled with a source host 116a) communicates with one or more receiver-PEs (e.g., a PE router 104 coupled with a receiver host 116b). A data MDT 160 is configured to off-load data traffic from the default MDT 150, for example, to minimize or reduce wasted bandwidth for one or more routers. In such an example embodiment, the data MDT 160 is configured to communicate multicast data traffic only to interested receivers (e.g., receiver hosts) and thereby preserve the bandwidth of disinterested receivers and/or routers, as will be disclosed herein. The data MDT 160 may be configured to be established or built up statically and/or dynamically. For example, when the data MDT 160 is configured to be built statically, the data MDT 160 may be configured to be established in response to a path message being communicated from one or more receiver-PEs to a source-PE. Alternatively, when the data MDT 160 is configured to be built dynamically, the data MDT 160 may be configured to be established in response to exceeding a preconfigured threshold of multicast data traffic. Additionally, the data MDT may be configured to operate similar to a data MDT for a multipoint generic routing encapsulation (mGRE) based mVPN.

Figure 4:
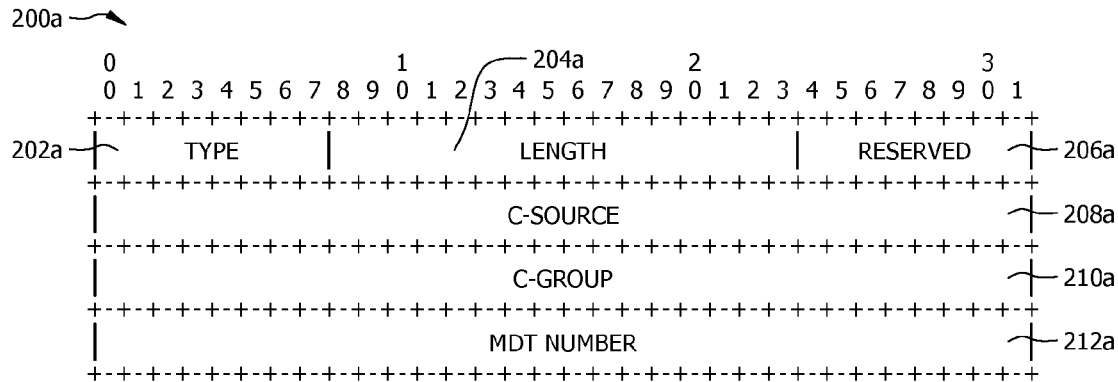
FIG. 4 is an example embodiment of a multi-distribution tree join data packet.
Figure 5:
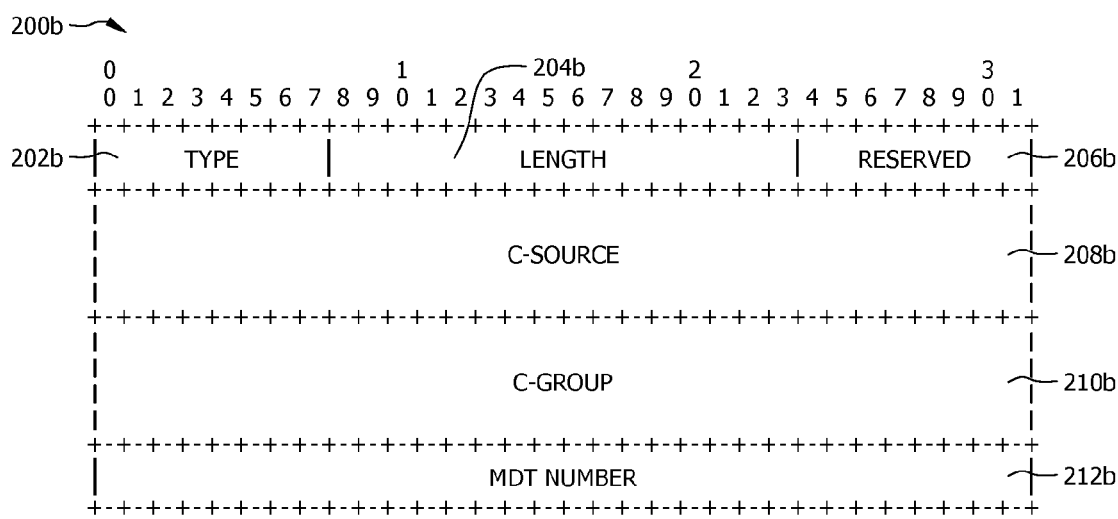
FIG. 5. is another example embodiment of a multicast distribution tree join data packet.
Figure 6:
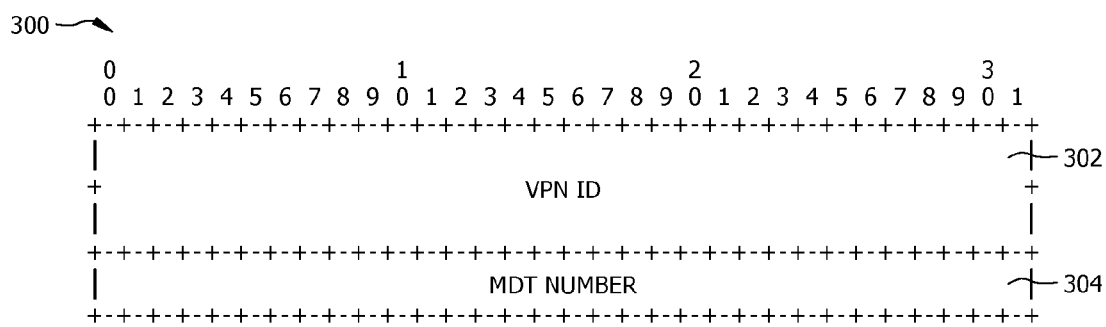
FIG. 6 is an example embodiment of a path message data packet.

Referring to FIGS. 4-6, one or more signaling data packets may be communicated between the routers (e.g., the root router 102, the PE routers 104, the CE routers 106, the core routers 114, etc.) of the mVPN 100 to establish one or more MDTs (e.g., a default MDT 150 or a data MDT 160). For example, a source host may communicate a one or more data packets to one or more receiver hosts to form a default MDT 150 and/or a data MDT 160, as will be disclosed herein.

Referring to FIG. 4, an internet protocol version 4 (IPv4) MDT join type-length-value (TLV) data packet 200a is illustrated. In the example embodiment of FIG. 4, the MDT join TLV data packet 200a comprises a plurality of data fields, for example, a type field 202a, a length field 204a, a reserved field 206a, a customer source (c-source) field 208a, a customer group (c-group) field 210a, and a MDT number field 212a. In such an example embodiment, the MDT join TLV data packet 200a for IPv4 comprises an 8-bit type field 202a, a 16-bit length field 204a, an 8-bit reserve field 206a, a 32-bit c-source field 208a, a 32-bit c-group field 210a, and a 32-bit MDT number field 212a.

Referring to FIG. 5, an IPv6 an MDT join TLV data packet 200b is illustrated. In the example embodiment of FIG. 5, the MDT join TLV data packet 200b comprises a plurality of data fields, for example, a type field 202b, a length field 204b, a reserved field 206b, a c-source field 208b, a c-group field 210b, and a MDT number field 212b. In such an example embodiment, the MDT join TLV data packet 200b for IPv6 comprises an 8-bit type field 202b, a 16-bit length field 204b, an 8-bit reserve field 206b, a 128-bit c-source field 208b, a 128-bit c-group field 210b, and a 32-bit MDT number field 212b.

While the example embodiments of FIGS. 4 and 5 are disclosed with respect to a particular bit size for each data field, it is noted that any data field may be any suitable bit size as would be appreciated by one of ordinary skill in the art upon viewing this disclosure.

In the example embodiment of FIGS. 4 and 5, the type field (e.g., type field 202a, 202b) may indicate the kind or type of message the data packet represents. The length field (e.g., length field 204a, 204b) may indicate the length or size of the MDT join TLV data packet. The reserved field (reserve field 206a, 206b) may be data field reserved for future use. The c-source field (e.g., c-source field 208a, 208b) may indicate the address of the traffic source (e.g., a source host) within the mVPN 100. The c-group field (e.g., c-group field 210a, 210b) may indicate the multicast traffic destination address within the mVPN 100. The MDT number field (e.g., MDT number field 212a, 212b) may be an MDT identifier, for example, an identifier for a data MDT 160 for a particular mVPN 100. For example, the MDT number field may be zero for a default MDT 150 or a non-zero number for a data MDT 160. Additionally, the MDT number field is assigned by a PE router 104 (e.g., a source-PE router).

Referring to FIG. 6, an mRSVP-TE path message data packet 300 is illustrated. In the example embodiment of FIG. 6, the mRSVP-TE path message data packet 300 comprises a plurality of data fields, for example, a VPN identification (ID) 302 and a MDT number 304. Additionally, the mRSVP-TE path message data packet 300 for both IPv4 and IPv6 comprises a 64-bit VPN ID 302 and a 32-bit MDT number 304. While the example embodiment of FIG. 6 is disclosed with respect to a particular bit size for each data field, it is noted that any data field may be any suitable bit size as would be appreciated by one of ordinary skill in the art upon viewing this disclosure. In the example embodiment of FIG. 6, the VPN ID 302 may be a mVPN 100 identifier. The MDT number 304 may be an MDT identifier. For example, the MDT number 304 may be similarly configured and/or employed as previously disclosed with respect to the MDT number 212a and 212b. The mRSVP-TE path message data packet 300 may be similar for both IPv4 and IPv6 except that the mRSVP-TE path message data packet 300 may have different class types (c-types) for IPv4 and IPv6.

Figure 7:
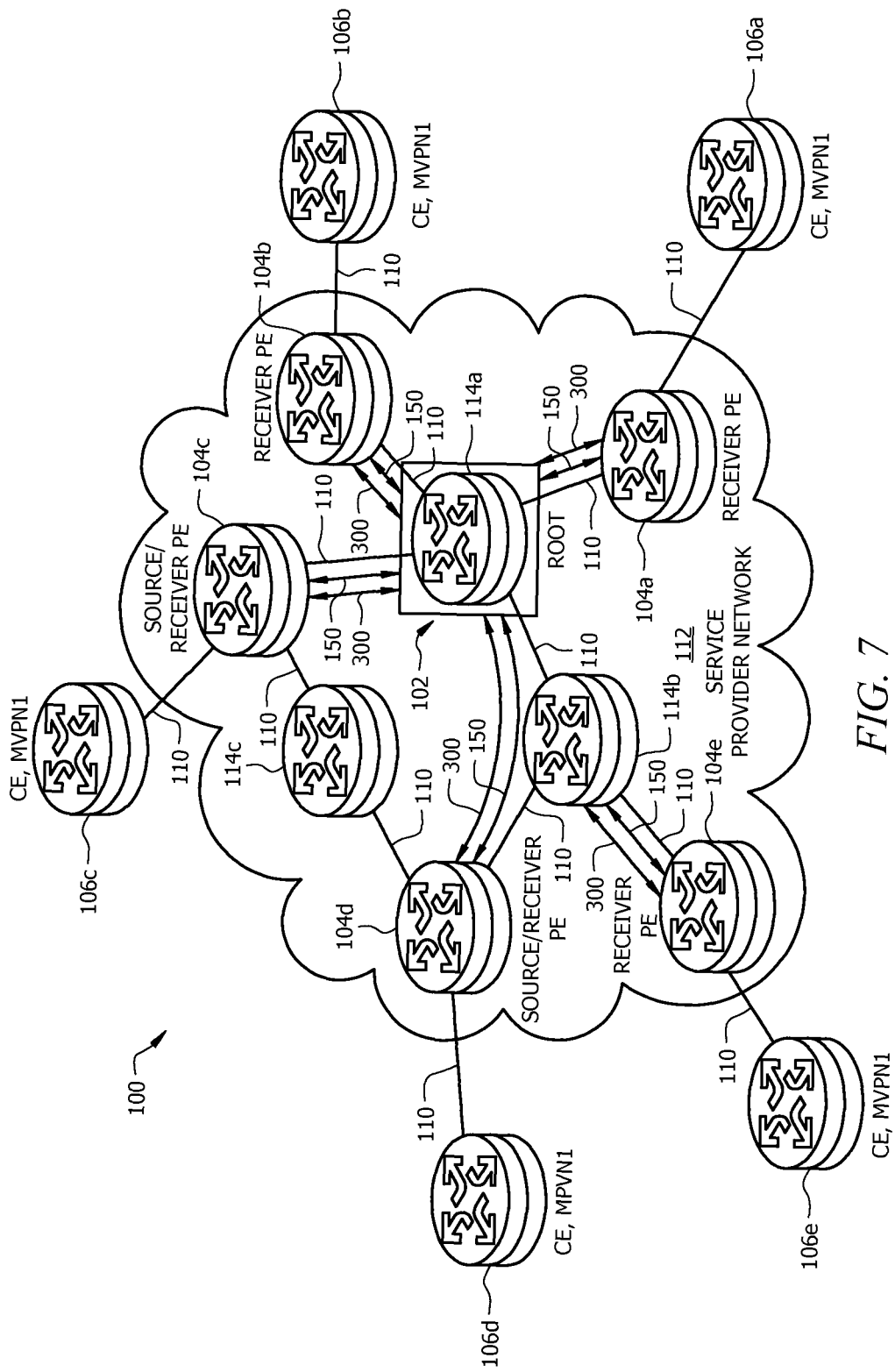
FIG. 7 is an example embodiment of a multicast distribution tree setup configuration.
Figure 8:
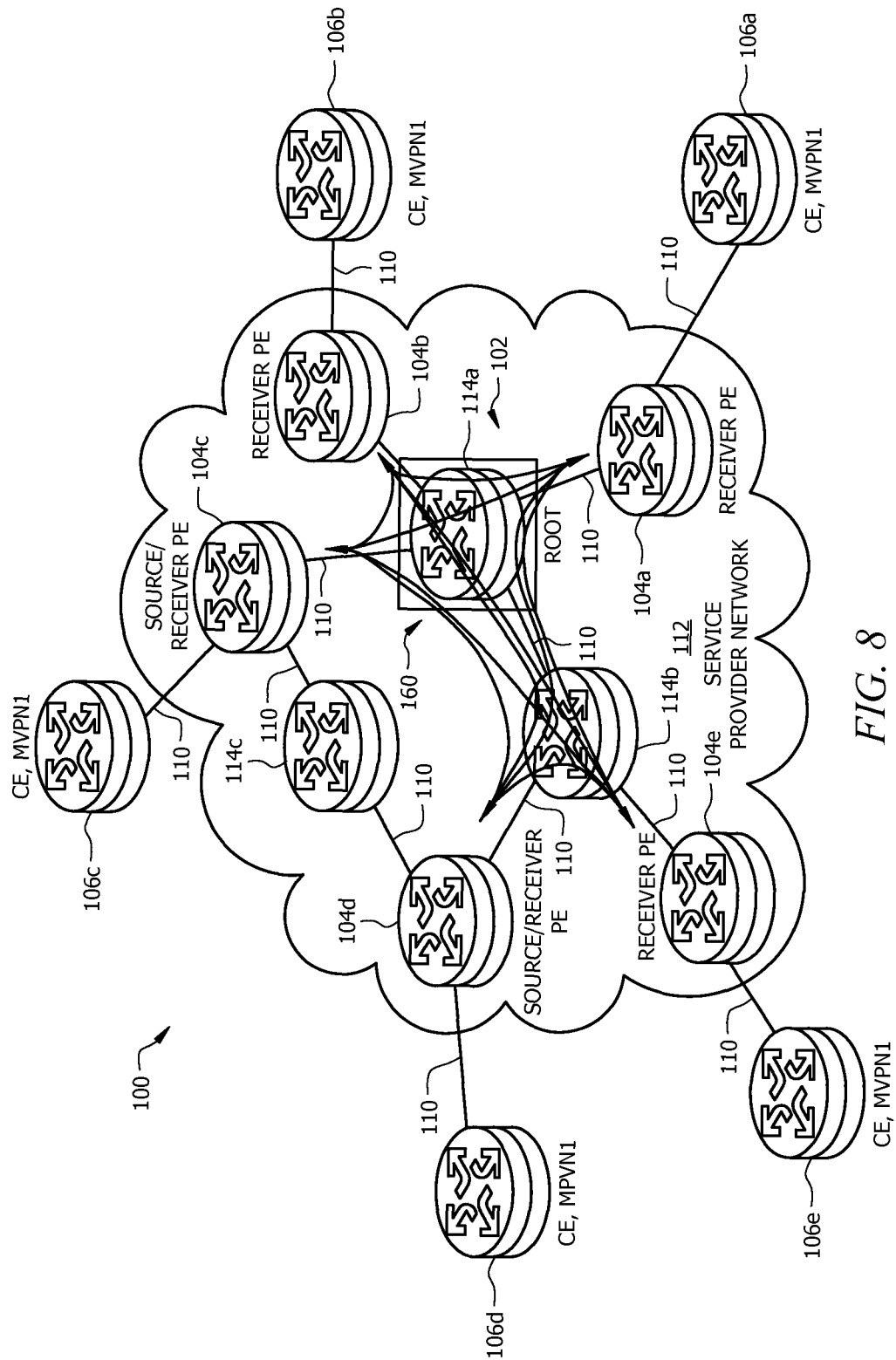
FIG. 8 is an example embodiment of a multicast distribution tree switching configuration.

Referring to FIGS. 7 and 8, the mVPN 100 comprises a router within the service provider network 112 (e.g., core router 114a) configured to be a root router 102. In such an example embodiment, the root router 102 is signal communication with a plurality of PE routers 104 and core routers 114. For example, the root router 102 is coupled to a first PE router 104a (e.g., a receiver-PE), a second PE router 104b (e.g., a receiver-PE), a third PE router 104c (e.g., a source/receiver-PE), a fourth PE router 104d (e.g., a source/receiver-PE) via a first core router 114b, and a fifth PE router 104e (e.g., receiver-PE). In such an example embodiment, an IP address for the root router 102 may be known or determined. Additionally, each of the PE routers 104a-104e may each be coupled to a CE router 106a-106e, respectively.

Referring to FIG. 7, upon enabling an mVPN 100, a default MDT 150 may be established to provide multicast data traffic services (e.g., to communicate multicast signaling messages and/or multicast data packets). In an example embodiment, an MI-PMSI interface (e.g., MI-PMSI(MVPN1)) is created for both a source-PE and one or more receiver-PEs. Additionally, upon creating the MI-PMSI interface, PIM messages may be communicated (e.g., from one or more CE routers 106) to the MI-PMS interface (e.g., MI-PMSI(MVPN1) of one or more PE routers 104. In an example embodiment, an mRSVP-TE path message data packet 300 is generated by each PE router 104 and is communicated via the mVPN 100 to the root router 102. In such an example embodiment, the mRSVP-TE path message data packet 300 comprises the VPN ID of the mVPN 100 (e.g., MVPN1) and the MDT number is set to zero. In an example embodiment, the mRSVP-TE path message data packet 300 from each PE router 104 may be communicated continuously. In such an example embodiment, the time interval to send an mRSVP-TE path message data packet 300 at each PE router 104 may be a default value or may be configurable. Upon receiving the mRSVP-TE path message data packet 300 from the PE routers 104, the root router 102 will communicate a received message or confirmation message back to each of the sending PE router 104 and thereby establish the default MDT 150. The received message or confirmation message may be any suitable acknowledgement data packet and/or message as would be appreciated by one of ordinary skill in the art upon viewing this disclosure. Upon establishing a default MDT 150, multicast data traffic may be communicated within the mVPN 100. For example, the mVPN 100 may communicate a customer's multicast data traffic and/or signaling messages to some or all PE routers 104 connected to the default MDT 150 via the default MDT 150.

Referring to FIG. 8, the mVPN 100 may establish a data MDT 160 to offload a portion of the multicast data traffic from the default MDT 150. In an example embodiment, where the mVPN 100 is configured to dynamically build a data MDT 160, a source-PE router may be configured to monitor the multicast data traffic flow within the default MDT 150 and such that in response to exceeding a predetermined multicast data traffic threshold a data MDT 160 will be generated, for example, to reduce the multicast data traffic flow on the default MDT 150. In an example embodiment, upon exceeding a predetermined multicast data traffic threshold, the source-PE generates a MDT join TLV data packet (e.g., MDT join TLV data packet 200a or 200b) and injects the MDT join TLV data packet into the default MDT 150. In such an example embodiment, the MDT join TLV data packet comprises a MDT number (e.g., MDT number 304) selected from a pool of available identifier numbers which may be uniquely associated with the data MDT. The MDT join TLV data packet will be received by all PE routers 104 (e.g., source-PEs, receiver-PEs, leaf PEs, etc.) within the mVPN 100. Upon receiving the MDT join TLV data packet the PE router 104 may decapsulate and/or parse the MDT join TLV data packet and extract data from the MDT join TLV data packet 200. In an example embodiment, the PE router 104 may process and/or extract information from the data packet, for example, to determine if the PE router 104 is an interested receiver router and/or a part of the group G. For example, the PE router 104 may extract and/or identify an MDT number (e.g., MDT number 212a or 212b), c-source information (e.g., c-source 208a or 208b), and/or c-group information (e.g., c-group 210a or 210b). Upon determining the PE router 104 is a member of the c-group (e.g., group G), the PE router 104 may initialize a P2MP tunnel via communicating a mRSVP-TE path message data packet 300 comprising the MDT number extracted from the MDT join TLV data packet to the source-PE via the default MDT 150. The source-PE may receive the mRSVP-TE path message data packet 300 having the MDT number from a plurality of receiver-PEs and thereby establishes a data MDT 160.

Upon establishing the data MDT 160, the mVPN 100 switches multicast data traffic (e.g., a multicast stream (S, G)) from the default MDT 150 to the data MDT 160. In an example embodiment, an S-PMSI interface (e.g., S-PMSI (MVPN_ID, MDT_ID)) is created. For example, the IIF of each receiver-PE and the OIF of the source-PE each change from an MI-PMSI interface to an S-PMSI interface. As such, the MPLS forwarding is switched from an MP2MP tunnel to a P2MP tunnel. Additionally, in an example embodiment, PIM signaling (e.g., PIM join, prune (S, G), etc.) may not be communicated via the data MDT 160 and is communicated via the default MDT 150.

Figure 9:
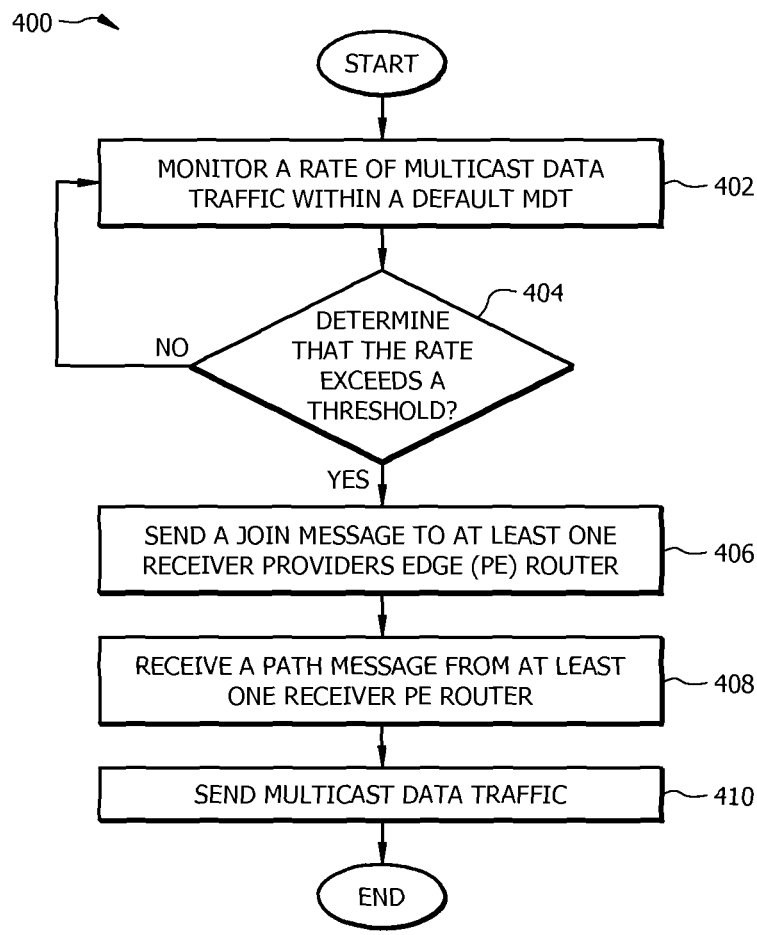
FIG. 9 is an example embodiment of a method of forming a data multicast distribution tree.

FIG. 9 is a method 400 of forming a data MDT in a source PE router. The method 400 comprises blocks 402-410. In block 402, a source PE router monitors a rate of multicast data traffic within the default MDT. For example, the source PE router may periodically check the statistics of a specific PIM states (S, G) to determine the number of data packets forwarded, for example, in terms of bits. In such an example, the rate may be calculated from the number of data packets forwarded, for example, by dividing the number of data packets forwarded by the product of the bit rate and the period duration for data communication. Alternatively, any suitable method for calculating and/or determining the multicast data traffic rate may be employed as would be appreciated by one of ordinary skill in the art upon viewing this disclosure. In block 404, the source PE router determines if the rate of multicast data traffic within the default MDT exceeds a threshold. In block 406, in response to the rate of multicast data traffic exceeding the threshold, the source PE router sends a MDT join TLV data packet (e.g., MDT join TLV data packet 200a, 200b) to one or more receiver PE routers. In block 408, the source PE router receives an mRSVP-TE path message data packet (e.g., mRSVP-TE path message data packet 300) from the one or more receiver PE routers and thereby establishes a data MDT (e.g., a data MDT 160 as shown in FIG. 8). In block 410, the source PE router sends multicast data traffic to the one or more receiver PE routers via the data MDT.

Figure 10:
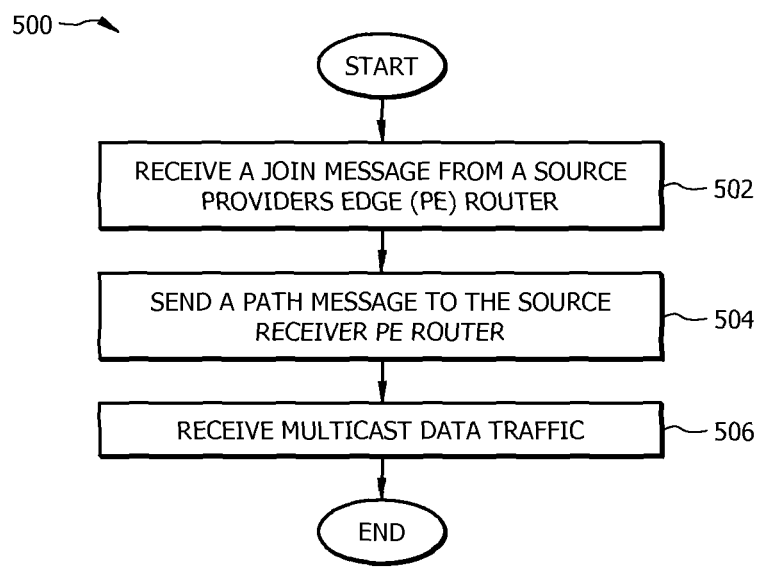
FIG. 10 is another example embodiment of a method of forming a data multicast distribution tree.

FIG. 10 is a method 500 of forming a data MDT in a receiver PE router. The method 500 comprises blocks 502-506. In block 502, a receiver PE router receives a MDT join TLV data packet (e.g., MDT join TLV data packet 200a, 200b) from a source PE router. In block 504, the receiver PE router sends an mRSVP-TE path message data packet (e.g., mRSVP-TE path message data packet 300) to the source PE router and thereby establishes the data MDT (e.g., a data MDT 160 as shown in FIG. 8). In block 506, the receiver PE router receives multicast data traffic from the source PE router via the data MDT.

Figure 11:
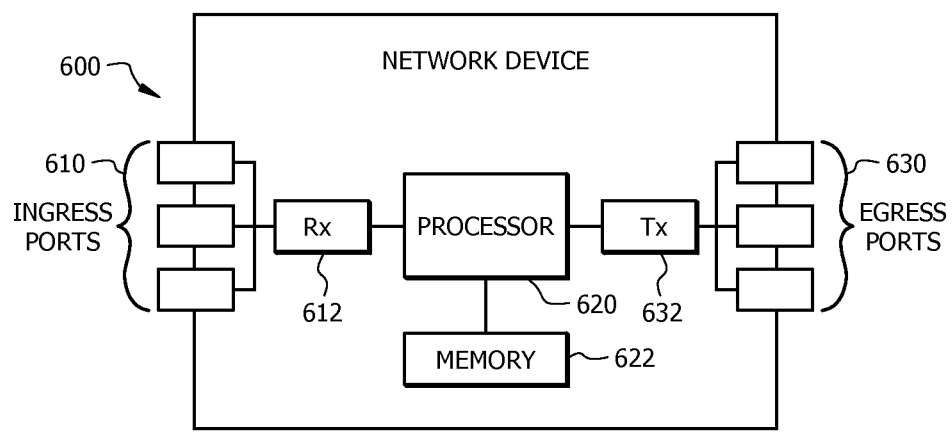
FIG. 11 is an example embodiment of a network device.

FIG. 11 illustrates an embodiment of a network device or apparatus 600, which may be any device configured to transport data frames or packets through a network. The network device 600 may comprise one or more ingress ports 610 coupled to a receiver 612 (Rx), which may be configured for receiving packets or frames, objects, options, and/or Type Length Values (TLVs) from other network components. The network device 600 may comprise a logic unit or processor 620 coupled to the receiver 612 and configured to process the packets or otherwise determine to which network components to send the packets. The processor 620 may be implemented using hardware or a combination of hardware and software. The processor 620 may be implemented as one or more central processor unit (CPU) chips, cores (e.g., a multi-core processor), field-programmable gate arrays (FPGAs), application specific integrated circuits (ASICs), and/or digital signal processors (DSPs). The network device 600 may further comprise a memory 622.

The memory 622 may comprise secondary storage, random access memory (RAM), and/or read-only memory (ROM) and/or any other type of storage. The secondary storage may comprise one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The network device 600 may also comprise one or more egress ports 630 coupled to a transmitter 632 (Tx), which may be configured for transmitting packets or frames, objects, options, and/or TLVs to other network components. Note that, in practice, there may be bidirectional traffic processed by the network device 600, and some ports may both receive and transmit packets. In this sense, the ingress ports 610 and the egress ports 630 may be co-located or may be considered different functionalities of the same ports that are coupled to transceivers (Rx/Tx). The processor 620, the receiver 612, and the transmitter 632 may also be configured to implement or support any of the procedures and methods described herein, such as the method for forming a data MDT 400, 500.

It is understood that by programming and/or loading executable instructions onto the network device 600, at least one of the processor 620 and the memory 622 are changed, transforming the network device 600 in part into a particular machine or apparatus (e.g., a source PE router or a receiver PE router). The executable instructions may be stored on the memory 622 and loaded into the processor 620 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

In an example embodiment, an mVPN 100 employing an MDT (e.g., a default MDT and a data MDT) and/or a method of use, as disclosed herein or in some portion thereof, may be advantageously employed to provide multicast services. In an example embodiment where PIM is used on a customer's site and mRSVP-TE is used on a service provider's network without PIM being enabled, an mVPN (e.g., mVPN 100) may be employed to provide the ability to inter-work the customer's PIM with the service provider's mRSVP-TE. Additionally, an mVPN 100 enables the ability to utilize unified messaging data packets (e.g., the mRSVP-TE path message data packet 300 and the MDT join TLV data packet 200) for communicating within the mVPN 100 to for a default MDT 150 and a data MDT 160. Further, the use of a MDT number to assign and track MDTs eliminates the need of a source address and/or a group address for multicast data communication which may reduce the message size. Therefore, the example embodiments disclosed herein improve the performance of a multicast data communication system.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent.

Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. A method of forming a data multicast distribution tree (MDT) in a source provider edge (PE) router, comprising the steps of:
   monitoring a rate of multicast data traffic within a default MDT;
   determining that the rate exceeds a threshold;
   sending a join message to at least one receiver PE router in response to the determining, wherein the join message comprises a MDT number that identifies the data MDT;
   receiving a path message including the MDT number from the at least one receiver PE router thereby forming the data MDT; and
   sending multicast data traffic via the data MDT.

2. The method of claim 1, further comprising selecting the MDT number from a pool of identifier numbers for the data MDT.

3. The method of claim 1, wherein the path message is a multicast resource reservation protocol-traffic engineering (mRSVP-TE) message comprising the MDT number and a virtual private network identification (VPN ID) number.

4. The method of claim 1, wherein the join message further comprises a customer source field and a customer group field, and wherein the customer source field and the customer group field identifies a protocol independent multicast (PIM) state.

5. The method of claim 1, wherein the MDT number is uniquely associated with a source address and a group address and is assigned by the source PE router.

6. The method of claim 1, further comprising establishing the default MDT via the steps of generating a second path message and sending the second path message to a root router and thereby establishing the default MDT, wherein the second path message comprises a second MDT number and a second VPN ID number, and wherein the second MDT number is set to zero.

7. The method of claim 1, further comprising creating a selective provider multicast service interface (S-PMSI).

8. A method of forming a data multicast distribution tree (MDT) in a receiver provider edge (PE) router, comprising the steps of:
   receiving a join message from a source PE router in response to the source PE router determining that a rate of multicast data traffic of a default MDT exceeds a threshold, wherein the join message comprises a MDT number that identifies the data MDT;
   sending a path message including the MDT number to the source PE router and thereby forming a data MDT; and
   receiving multicast data traffic via the data MDT.

9. The method of claim 8, further comprising selecting the MDT number from a pool of identifier numbers for the data MDT.

10. The method of claim 8, wherein the path message is a multicast resource reservation protocol-traffic engineering (mRSVP-TE) message comprising the MDT number and a virtual private network identification (VPN ID) number.

11. The method of claim 8, wherein the join message further comprises a customer source field and a customer group field, and wherein the customer source field and the customer group field identifies a protocol independent multicast (PIM) state.

12. The method of claim 8, wherein the MDT number is uniquely associated with a source address and a group address.

13. The method of claim 8, further comprising establishing the default MDT via the steps of generating a second path message and sending the second path message to a root router and thereby establishing the default MDT wherein the second path message comprises a second MDT number and a second VPN ID number, and wherein the second MDT number is set to zero.

14. The method of claim 8, further comprising creating a selective provider multicast service interface (S-PMSI).

15. A computer program product comprising computer executable instructions for forming a data multicast distribution tree (MDT) stored on a non-transitory computer readable medium of a router that, when executed by a processor, cause the router to:
   monitor a rate of multicast data traffic within a default MDT;
   determine that the rate exceeds a threshold;
   send a join message in response to the determining, wherein the join message comprises a MDT number that identifies the data MDT;
   receive a path message including the MDT number thereby forming the data MDT; and
   send multicast data traffic via the data MDT.

16. The computer program product of claim 15, further comprising instructions that cause the router to select the MDT number from a pool of identifier numbers for the data MDT.

17. The computer program product of claim 16, wherein the MDT number is uniquely associated with a source address and a group address.

18. The computer program product of claim 15, wherein the path message is a multicast resource reservation protocol-traffic engineering (mRSVP-TE) message comprising the MDT number and a virtual private network identification (VPN ID) number.

19. The computer program product of claim 15, wherein the join message further comprises a customer source field and a customer group field, and wherein the customer source field and the customer group field identifies a protocol independent multicast (PIM) state.

20. The computer program product of claim 18, further comprising instructions for forming the default MDT that cause the router to generate a second path message and send the second path message to a root router and thereby establishing the default MDT, wherein the second path message comprises a second MDT number and a second VPN ID number, and wherein the second MDT number is set to zero.

* * * * *